(12) United States Patent
Arvelo (10) Patent No.: US 7,082,107 B1
(45) Date of Patent: Jul. 25, 2006

(54) POWER CONTROL IN WIRELESS COMMUNICATIONS BASED ON ESTIMATIONS OF PACKET ERROR RATE

(75) Inventor: Eladio C. Arvelo, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 554 days.

(21) Appl. No.: 09/994,260

(22) Filed: Nov. 26, 2001

(51) Int. Cl.
*G08C 17/00* (2006.01)
*H04B 7/00* (2006.01)
*H04J 3/12* (2006.01)

(52) U.S. Cl. .................... 370/311; 370/522
(58) Field of Classification Search ............. 370/241, 370/252, 310, 311, 522; 455/68, 69
See application file for complete search history.

(56) References Cited

U.S. PATENT DOCUMENTS

| | | | |
|---|---|---|---|
| 5,056,109 A | 10/1991 | Gilhousen et al. | |
| 5,265,119 A | 11/1993 | Gilhousen et al. | |
| 5,267,262 A | 11/1993 | Wheatley, III | |
| 5,383,219 A | 1/1995 | Wheatley, III et al. | |
| 5,392,287 A | 2/1995 | Tiedemann, Jr. et al. | |
| 5,396,516 A | 3/1995 | Padovani et al. | |
| 5,452,473 A | 9/1995 | Weiland et al. | |
| 5,469,471 A | 11/1995 | Wheatley, III | |
| 5,590,409 A * | 12/1996 | Sawahashi et al. | ............ 455/69 |
| 5,604,730 A * | 2/1997 | Tiedemann, Jr. | ............ 370/252 |
| 5,930,692 A | 7/1999 | Peterzell et al. | |
| 5,933,781 A | 8/1999 | Willenegger et al. | |
| 5,960,361 A | 9/1999 | Chen | |
| 5,982,760 A | 11/1999 | Chen | |
| 5,983,183 A * | 11/1999 | Tabet et al. | ................. 704/270 |
| 5,987,326 A | 11/1999 | Tiedemann, Jr. et al. | |
| 6,035,209 A | 3/2000 | Tiedemann, Jr. et al. | |
| 6,067,458 A | 5/2000 | Chen | |
| 6,070,085 A | 5/2000 | Bender et al. | |
| 6,075,974 A | 6/2000 | Saints et al. | |
| 6,097,972 A | 8/2000 | Saints et al. | |
| 6,101,179 A | 8/2000 | Soliman | |
| 6,137,840 A | 10/2000 | Tiedemann, Jr. et al. | |
| 6,157,668 A | 12/2000 | Gilhousen et al. | |
| 6,185,432 B1 | 2/2001 | Vembu | |
| 6,188,678 B1 | 2/2001 | Prescott | |
| 6,208,873 B1 | 3/2001 | Black et al. | |
| 6,754,506 B1 * | 6/2004 | Chang et al. | ............... 455/522 |
| 6,760,317 B1 * | 7/2004 | Honkanen et al. | ......... 370/329 |
| 6,760,599 B1 * | 7/2004 | Uhlik | ......................... 455/525 |
| 6,765,883 B1 * | 7/2004 | van Heeswyk | ............. 370/318 |
| 6,775,764 B1 * | 8/2004 | Batcher | ...................... 712/227 |

* cited by examiner

*Primary Examiner*—Chau Nguyen
*Assistant Examiner*—Cynthia L. Davis
(74) *Attorney, Agent, or Firm*—James S. Finn (57) ABSTRACT

Power is controlled by increasing the power level of a wireless transmission if a number of packet errors in a short observation window exceeds a first threshold. Power is controlled by decreasing the power level of the wireless transmission if a number of packet errors in a long observation window falls below a second threshold. In various embodiments, power is controlled based on packet error rate using both open and closed loop feedback to manage power at an increased level of granularity.

9 Claims, 7 Drawing Sheets

POWER CONTROL IN WIRELESS COMMUNICATIONS BASED ON ESTIMATIONS OF PACKET ERROR RATE

FIELD OF THE INVENTION

The present invention pertains to the field of wireless communications. More particularly, this invention relates to power control in wireless communications based on packet error rate.

BACKGROUND

Wireless communications make a wide variety of flexible and mobile communications possible. In particular, wireless data communications is a rapidly developing market and area of technology. Numerous devices, such as laptop computers, personal data assistants (PDAs), and the like, can use wireless communications to connect to networks, printers, or other devices. A number of standards have been developed for wireless data communications so that any device conforming to a standard can communicate with any other device that conforms to the same standard. One example of a wireless communication standard is called Bluetooth.

Bluetooth is a standard primarily developed for short-distance wireless connections. Bluetooth can be used in place of a variety of proprietary cables currently used to connect devices. For instance, printers, desktop computers, fax machines, keyboards, joysticks, and virtually any other device can be part of a Bluetooth system. Bluetooth can also be used to form small networks of multiple systems, such as a network among a number of computers, server machines, printers, etc., located in the same general vicinity, such as in a room or office.

Controlling the power level of wireless transmissions is a major concern. Often, wireless devices are battery operated. Keeping power levels low prolongs the life of batteries. Also, when several wireless devices are operating in close proximity, a wireless transmission from one device may interfere with another wireless transmission from another device. Keeping power levels low reduces the amount of interference.

One common approach to managing transmission power levels relies on the received signal strength indicator (RSSI). RSSI indicates how strong a signal is at a receiver. If the RSSI drops below a certain level at a receiver, the receiver can send a command to the transmitter instructing the transmitter to increase the power level of the transmission.

Relying on RSSI has a number of disadvantages. For instance, RSSI is a measure of signal strength at the receiver. In order to control the power level at the transmitter, a "closed loop" is required. That is, the receiver has to send power control feedback messages to the transmitter. The transmitter does not decide on its own what circumstances warrant an increase or decrease in transmission power, which would be an "open loop" system.

Also, in order to decide when the transmission power can be increased or decreased, the RSSI level needs to be compared to some ideal, or target, RSSI level. The target RSSI level depends on the characteristics of the "channel" between the transmitter and the receiver. For instance, if there are high levels of interference between the transmitter and the receiver, the target RSSI level will probably be much higher than if there are low levels of interference. And of course, in a wireless channel, the channel characteristics can change over time as objects are moved, electrical devices are turned on and off, etc.

A number of approaches have been developed for determining a target RSSI. For instance, a predefined training sequence can be transmitted from time to time. The receiver can measure the channel characteristics based on the known training sequence. Then, the receiver can calculate an appropriate target RSSI based on the channel characteristics. Of course, training sequences can become tiresome to a user, like the training session at the beginning of a modem connection, and training sessions during a transmission to compensate for changes in channel characteristics can consume bandwidth that could otherwise be used for transmitting data.

The accuracy, or lack thereof, of RSSI measurements create another disadvantage to RSSI-based power control. RSSI measurements are typically only accurate to within 4 dB. This level of inaccuracy limits the granularity with which the transmission power level can be controlled. That is, the RSSI measurement may not accurately discern a power level fluctuation under 4 dB, so a transmission power level cannot be controlled with any accuracy at step sizes less than 4 dB. As a result, a power level may be set at as much as 4 dB higher than it needs to be, unnecessarily increasing the power consumption and unnecessarily increasing interference with other transmissions.

BRIEF DESCRIPTION OF THE DRAWINGS

Examples of the present invention are illustrated in the accompanying drawings. The accompanying drawings, however, do not limit the scope of the present invention. Similar references in the drawings indicate similar elements.

DETAILED DESCRIPTION

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternate embodiments. In other instances, well known methods, procedures, components, and circuits have not been described in detail.

Parts of the description will be presented using terminology commonly employed by those skilled in the art to convey the substance of their work to others skilled in the art. Also, parts of the description will be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

Various operations will be described as multiple discrete steps performed in turn in a manner that is helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

The present invention controls wireless transmission power levels based on packet error rate. In wireless transmission, packet error rate, rather than signal strength, is a more reliable measure of signal quality. For instance, in order to achieve a certain quality of signal, a packet error rate of, for instance, 0.01, or an average of 1 error per 100 packets, may be suitable. In contrast, the signal strength may fall anywhere within a wide range of values to achieve a 0.01 packet error rate depending on the channel characteristics, such as interference, in the signal's channel. Moreover, as the channel characteristics change, the signal strength needed to achieve the desired level of signal quality is likely to change.

Using packet error rate to control power rather than the received signal strength indicator (RSSI), the present invention can provide both open and closed loop power control without first determining a target RSSI based on channel characteristics. The present invention can also control power at a finer granularity than RSSI-based power control, achieving power control steps of 2 dB and below compared to power control steps of 4 dB and above for RSSI-based power control.

In general, the present invention monitors packet errors in two observation windows. Each window monitors a contiguous stream of packets. The shorter window is used to recognize when the power level is too low. If more than a certain threshold of packet errors are observed in a short period of time, the power level is increased. That is, the short window provides rapid increases in power to quickly respond to low signal quality and detrimental changes in the channel characteristics.

The longer window is used to recognize when the power level is higher than it needs to be for the desired signal quality. If the power level is too high, fewer packet errors than expected will occur. A longer window is needed because more packets need to be observed in order to recognize a lower packet error rate.

The present invention seeks to ensure signal quality by rapidly increasing power in response to an excessive packet error rate. Decreasing power in response to unnecessarily high signal quality takes longer, but what the present invention lacks in terms of speed, it compensates for in terms of accuracy. That is, the present invention may transmit at a higher power level than necessary from time to time as it monitors a long window of packets. But, the present invention can recognize finer levels of signal quality than, for instance, an RSSI measurement. As a result, where an RSSI measurement may allow a power level that is 4 dB higher than necessary, the present invention will eventually recognize that the power level could be reduced by, for instance, another 2 dB.

Figure 1:
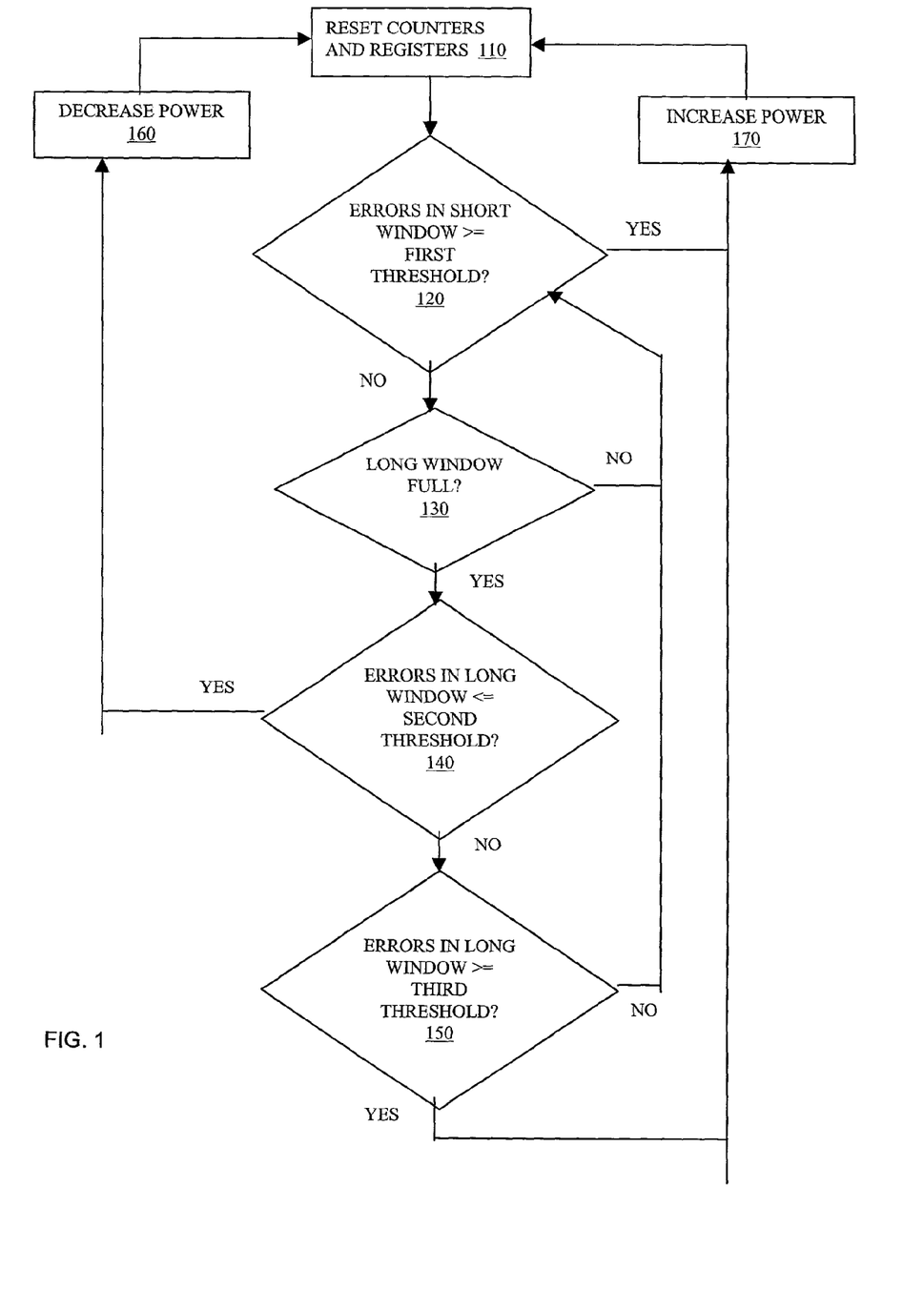
FIG. 1 demonstrates one embodiment of the present invention.

FIG. 1 demonstrates one embodiment of the present invention. In block 110, counters and registers are reset. In block 120, the process counts the number of packet errors in the short observation window and compares that number of packets to a first threshold. If the number of packet errors is greater than or equal to the first threshold, the packet error rate is higher than desired, indicating that the transmission power level is too low. In which case, the process proceeds to block 170 to increase the power. From block 170, the process returns to block 110 to reset and start over again.

If the number of errors is less than the threshold in block 120, the process proceeds to block 130 to monitor more packets and count packet errors. If enough packets have not yet been received to fill the long observation window, the process loops back to block 120 and determines whether or not the number of packet errors counted in the most recent contiguous short set of packets is greater than or equal to the first threshold. If at any time the first threshold is reached or exceeded in block 120, the power level is increased in block 170 and the process resets and starts again in block 110.

Assuming the first threshold is not reached or exceeded in any contiguous set of packets in the short window, the process loops through blocks 120 and 130 until enough packets accumulate to fill the long observation window. Once the long observation window is filled in block 130, the number of packet errors accumulated during the long observation window is compared to a second threshold in block 140.

If the number of errors in the long window is too small, then the power level is higher than necessary. In other words, if the number of packet errors in the long observation window is less than or equal to the second threshold, the packet error rate has fallen below the desired rate and the signal quality is higher than desired. In which case, the process proceeds to decrease the power in block 160 and reset and restart the process in block 110.

In the illustrated embodiment, the process includes an additional step for additional accuracy. Even if the number of errors accumulated in the short window is less than the first threshold, the process compares the number of errors accumulated in the long window to a third threshold in block 150. If the number of errors accumulated in the long window is greater than or equal to the third threshold, the signal quality is lower than desired, so the power is increased in block 170 and the process resets and restarts in block 110. By accumulating errors over a longer window, the process more accurately determines the signal quality.

Conversely, if the number of errors accumulated in the long observation window is less than the third threshold, the signal quality is as desired and the process loops back to block 120. Assuming no power adjustments are needed, the process continuously loops through blocks 120, 130, 140, and 150, repeatedly testing the thresholds on the most recently received contiguous sets of packets filling the short observation window and the long observation window.

Any number of mathematical approaches can be used to determine the size of the observation windows and the three threshold values to get a statistical estimation of whether the current packet error rate is higher or lower than a target given packet error rate. For instance, if the target average packet error rate is 0.01, one solution is a short window of 35 packets, a long window of 135 packets, a first threshold of 2 packet errors, a second threshold of 0 packet errors, and a third threshold of 4 packet errors. In which case, if two or more packet errors are encountered in any contiguous 35 packets, the power level will be increase no errors are encountered in any contiguous 135 packets, the power level will be decreased. And, in the illustrated embodiment of FIG. 1, if four or more packet errors are encountered in any contiguous 135 packets, the power level is again increased.

Figure 2:
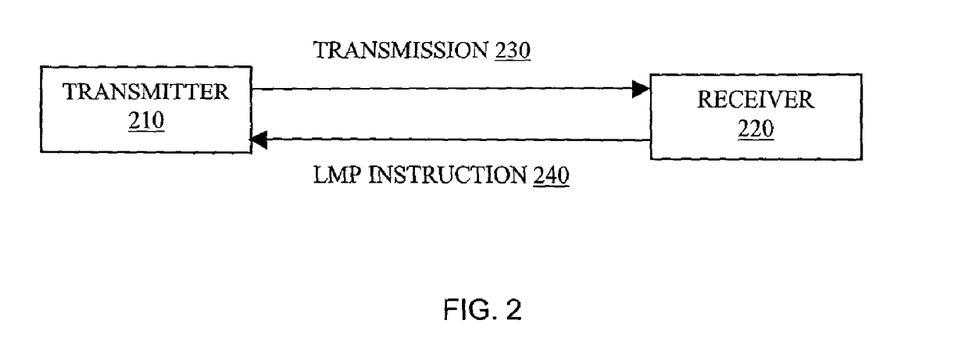
FIG. 2 illustrates one embodiment of closed loop feedback control.

FIG. 2 illustrates one embodiment of closed loop power control in a Bluetooth data link. Transmitter 210 sends the Bluetooth transmission 230 to the receiver 220. As part of the Bluetooth standard, receiver 220 performs a cyclic redundancy check (CRC) on certain data packets. A CRC failure indicates a packet error. Receiver 220 counts the CRC failures and performs a power control operation such as the one discussed above with respect to FIG. 1. That is, receiver 220 counts the indicated packet errors during the short and long observation windows and compares the number of errors to the respective thresholds. If the power level at the transmitter 210 needs to be adjusted to achieve the desired signal quality, receiver 220 sends a link manager protocol (LMP) instruction 240 to the transmitter. LMP instructions are also a part of the Bluetooth standard and are commonly used for RSSI-based closed loop power control. The LMP instruction 240 tells the transmitter to either increase or decrease the power level accordingly.

The illustrated embodiment is a closed loop in that the receiver decides when the power level needs to be adjusted and instructs the transmitter accordingly. In other words, the power control "intelligence" is in the receiver.

Figure 3:
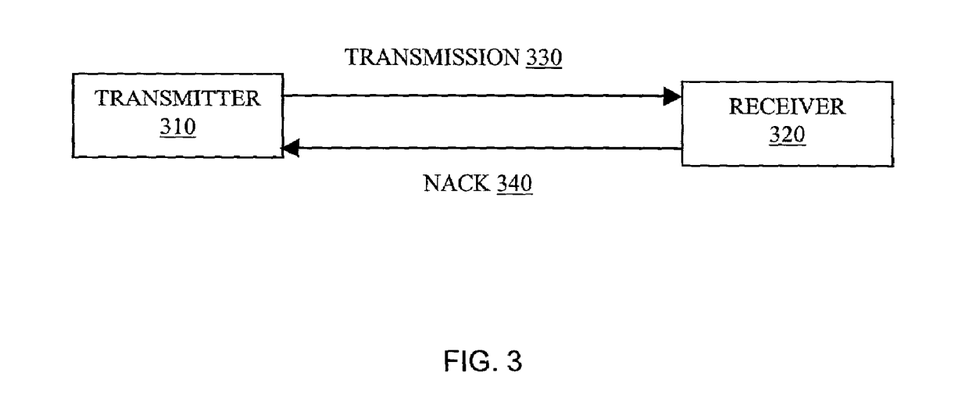
FIG. 3 illustrates one embodiment of open loop feedback control.

FIG. 3 illustrates one embodiment of open loop power control in a Bluetooth data link. Transmitter 310 sends the Bluetooth transmission 330 to the receiver 320. As part of the Bluetooth standard, receiver 320 performs the CRC on certain data packets to identify packet errors. Also as part of the Bluetooth standard, an unnumbered acknowledgement scheme is used in which a single bit informs the sender, transmitter 310, whether or not the payload of a packet was successfully received based on the outcome of the CRC. For each positive CRC result, the receiver 320 sends a positive acknowledgement (ACK). For each CRC failure, receiver 320 sends a negative acknowledgement (NACK) message 340 to the transmitter 310 to let the transmitter 310 know that a particular packet of data had an error. NACK messages are commonly used so that the transmitter will know to re-transmit the data in the packet that had the error.

Transmitter 310 counts the NACK messages 340 and performs a power control operation such as the one discussed above with respect to FIG. 1. That is, transmitter 310 counts the indicated packet errors during the short and long observation windows and compares the number of errors to the respective thresholds. If the power level at the transmitter 310 needs to be adjusted to achieve the desired signal quality, the transmitter 310 either increases or decreases the power level accordingly.

The illustrated embodiment is an open loop in that the receiver does not decide when the power level needs to be adjusted. Rather, the transmitter decides for itself when to adjust the power. That is, the power control "intelligence" is in the transmitter.

Providing an open loop option allows a transmitter to unilaterally manage power based on the packet error rate. If both the transmitter and receiver are equipped for packet error-based power control, either open loop or closed loop control may be available. If only the transmitter is equipped for packet error-based power control, only open loop power control will be available. If only the receiver is equipped for packet error-based power control, open loop power control may still work if the transmitter is capable of receiving and interpreting power control instructions, such as LMP power control commands.

Also, if both open loop and closed loop power control are available, there is a possibility of conflicting power control commands. That is, a receiver may send a closed loop instruction to a transmitter to decrease power while the transmitter's own open loop power control calculations call for an increase in power. For example, this situation may arise if the receiver does not generate an acknowledgement for a particular type of packet, or if the receiver defers sending an acknowledgement for any of a variety of reasons. In either case, the transmitter may interpret the lack of an acknowledgement as evidence of a packet error when in fact no packet error may have occurred.

In one embodiment of the present invention, conflicting power control commands are handled by giving priority to closed loop power control commands. However, even if a receiver is capable of issuing closed loop power control commands, there is no guarantee that the receiver will indeed send any power control requests. In which case, one embodiment of the present invention uses open-loop power control as the default power control, and only switches to closed-loop if a closed-loop power control command is actually received.

A Bluetooth connection goes through a number of stages and uses a variety of different packet types in the different stages. Certain packet types, such as POLL packets, are not acknowledged with a single-bit ACK or NACK, but are instead replied to with a full packet, such as a NULL or ACL (Asynchronous Connection-less link) packet. In which case, one embodiment of the invention treats a correlated reply packet, such as a NULL or ACL packet, as an implicit acknowledgement for power control purposes.

Other packet types, such as NULL packets and SCO (Synchronous Connection-Oriented link) packets, are not acknowledged at all. In which case, NULL and SCO packets are essentially ignored in one embodiment of the invention and, therefore, are not power controlled. One concern, however, is that these packets may be repeated for a comparatively long period of time if, for instance, the wireless device is in some form of stand-by mode. In which case, as channel characteristics change, the estimated packet error rate, and consequently the most recent power level, may become "stale."

To address this, one embodiment of the present invention includes a "stale" timer. The timer resets and starts counting after each acknowledgement. If no acknowledgements are encountered within the time period specified by the timer, the power level is increased by, for instance, one step and the timer is reset and restarted. In one embodiment, the duration of the timer is programmable. In another embodiment, these packets are simply transmitted at maximum power. A programmable register could be used to select among using the most recent power level, using maximum power, and, if a stale timer is available, using the stale timer for packet types that are not acknowledged at all.

In one embodiment, the present invention begins at maximum power when a new wireless connection is established. When returning from a stand-by mode, one embodiment also resumes the wireless connection using the maximum power level. Alternately, as discussed above, the present invention could maintain the most recent power level when entering a stand-by mode, and incrementally increase the power level as the current power level becomes "stale." In yet another alternative, the present invention could attempt to resume the wireless connection initially using the most recent power level, but switch to maximum power if the first attempt to resume the wireless connection fails. Any number of additional approaches to initiate and/or re-initiate power control can be used.

Figure 4:
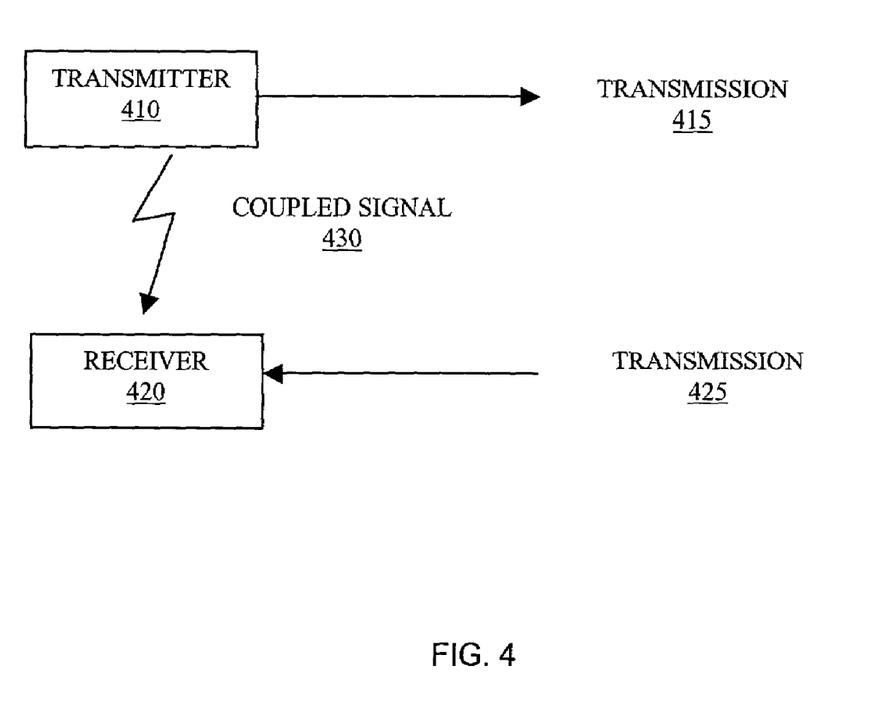
FIG. 4 illustrates one embodiment of controlling a power level of a coupled signal between a transmitter and a receiver in close proximity.

FIG. 4 illustrates one embodiment of a transmitter 410 in close proximity to a receiver 420. Transmitter 410 is sending transmission 415. Receiver 420 is simultaneously receiving transmission 425. Transmitter 410 introduces a coupled signal 430 that interferes with transmission 425 at receiver 420. The power level of the coupled signal 430, and therefore the level of interference caused by it, is directly related to the power level of transmission 415.

If the power level of transmission 415 is controlled based on packet error rate rather than receive signal strength indication (RSSI), the power level can be controlled to a finer granularity; for instance in 2 dB steps rather than 4 dB. Controlling the power level at a lower granularity allows the average power level of the coupled signal 430 to be held to a lower value, thereby reducing the amount of interference and improving the signal quality of transmission 425 received at receiver 420.

For instance, the power level of transmitter 410 may have a 30 dB range, and controlling the power using packet error-based control can provide 16 steps of 2 dB each. In contrast, a RSSI-based control would at most have 8 steps of 4 dB each for a 30 dB range.

This example can also be used to illustrate the relative speed difference between increasing power using the short observation window and decreasing power using the long observation window. For instance, using the parameters from above, the target packet error rate is 0.01. The short window, $N_{short}$, is 35 packets. The long window, $N_{long}$, is 135 packets. With a power range of 30 dB, the average initial power mismatch is half of the range, or 15 dB. A 15 dB adjustment will take 8 steps of 2 dB each to reach steady state. Packets are received at a rate of one every 625 micro seconds. In which case, the minimum time needed to reach steady state equals N packets×625 micro seconds×2 time slots per packet×8 steps.

For power increases, there is no reason to wait for the entire short window to be filled before increasing the power. Instead, the power level can be increased as soon as the number of packet errors hits the first threshold, which is two packets in this example. Therefore, the power level can be increased one step after as few as two packets. In which case, the minimum duration to increase power per step is at least 2 packets×625 micro seconds×2 time slots per packet, or about 2.5 milliseconds. If steady state takes 8 steps, the minimum duration to reach steady state is about 0.02 seconds.

For power decreases, it may be necessary to wait for the entire long window to be filled because power is only decreased if too few packet errors are encountered during the long window. In which case, the minimum duration to decrease power per step is at least 135 packets×625 microseconds×2 time slots per packet, or about 169 milliseconds. If steady state takes 8 steps, the minimum duration to reach steady state is at least 1.35 seconds. Once steady state is reached, a single step up in power can take as little as 0.0025 seconds and a single step down can take as little as 0.169 seconds.

Figure 5A:
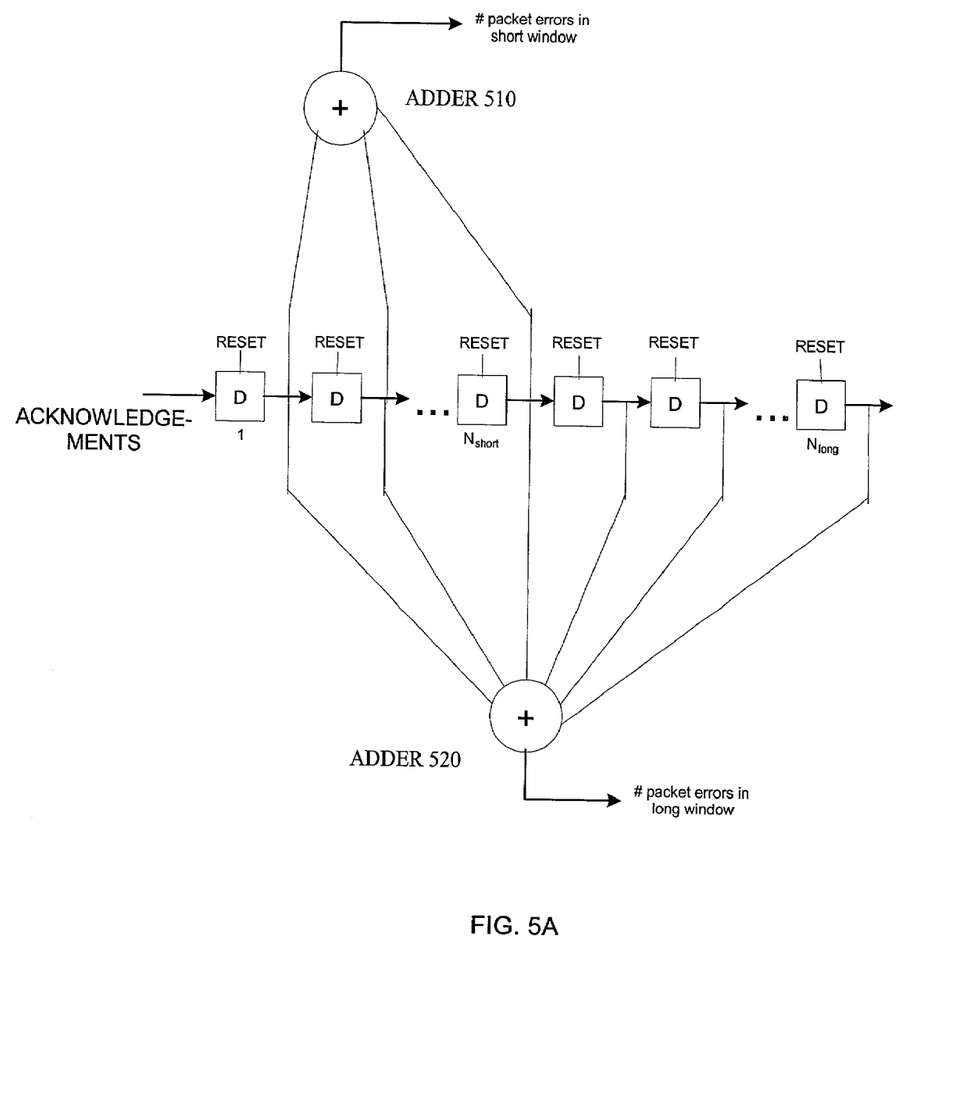
FIGS. 5A and 5B illustrate one embodiment of an apparatus to perform the present invention.
Figure 5B:
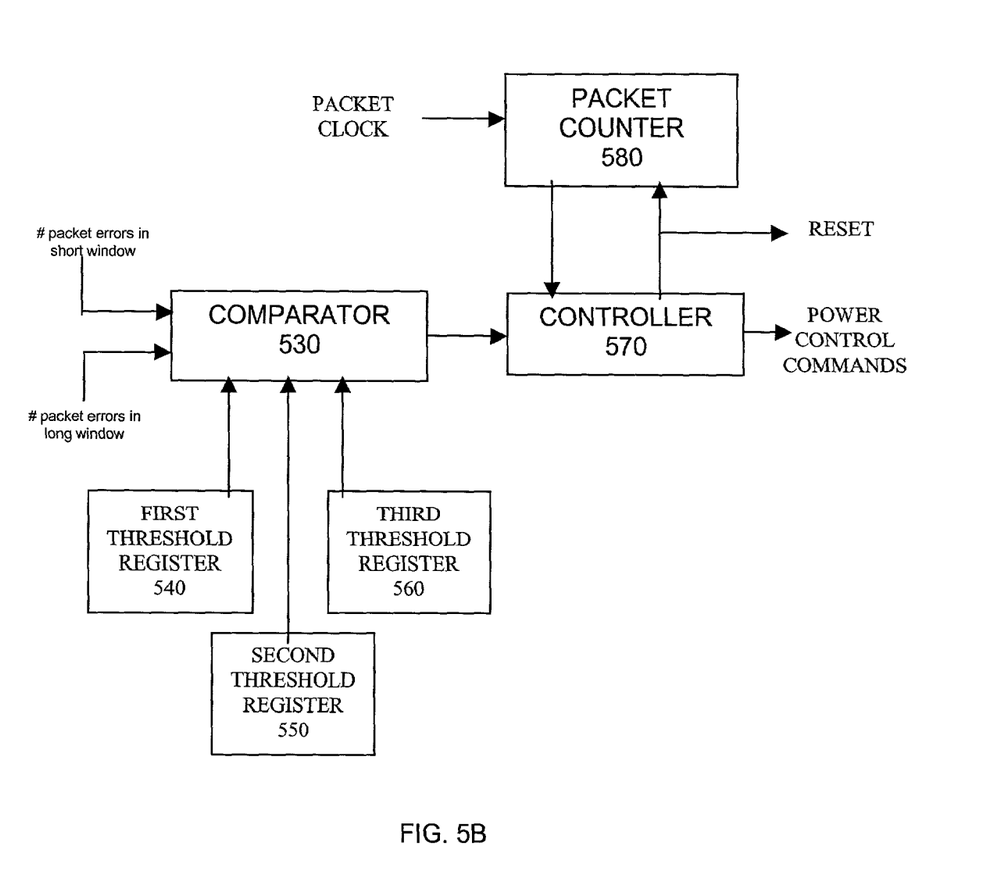

FIGS. 5A and 5B illustrate one embodiment of an apparatus for counting packet errors. FIGS. 5A and 5B include a number of implementation specific details. Alternate embodiments can use any number of approaches to track packet errors during the short and long observation windows.

In the illustrated embodiment, a transmitter is performing open loop power control. That is, the transmitter is receiving acknowledgements, either positive (ACK) or negative (NACK), from a receiver to identify packet errors. A similar apparatus could be used in a closed loop system by feeding the apparatus CRC failures within a receiver rather than ACK and NACK messages.

The illustrated embodiment includes a packet error counter in FIG. 5A, and a comparator and controller in FIG. 5B. The packet error counter comprises a string of delays D and two adders, adder 510 and adder 520. The outputs of the adders 510 and 520 are fed to the comparator 530 and the results from the comparator are fed to the controller 570.

The delays match the rate at which packets are transmitted. So, for example, if a NACK message is received for a packet, the NACK message sits at the output of the first delay. If the next packet does not experience a packet error, an ACK message will appear at the input to the first delay to indicate a positive acknowledgement, and the initial NACK message for the first packet will have moved on to the output of the second delay. As more packets are sent, the initial NACK message will step through the string of delays, and if any additional NACK messages are received, they will also step through the string of delays, trailing the initial NACK message by a number of delays equivalent to the number of packets separating them in the transmission.

In hardware, the delays could be a string of edge triggered flip-flops clocked by a packet clock at the packet transmission rate. In alternate embodiments, any number of components could be used for the delays.

At any instant in time, adder 510 counts the number of NACK messages, or packet errors, in the most recent set of $N_{short}$ packets and provides the number of packet errors to comparator 530. The threshold for packet errors in the short observation window is stored in register 540 and is also provided to comparator 530. If comparator 530 indicates that the number of NACK messages is greater than or equal to the threshold for packet errors in the short observation window, controller 570 increases the power level of the transmission and resets packet counter 580 and the string of delays.

Similarly, at any instant in time, adder 520 counts the number of NACK messages, or packet errors, in the most recent set of $N_{long}$ packets and provides the number of packet errors to comparator 530. The minimum threshold for packet errors in the long observation window is stored in register 550 and the maximum threshold for packet errors in the long observation window is stored in register 560. Both thresholds are also provided to comparator 530.

Packet counter 580 counts the number of packets received based on the packet clock. Once packet counter 580 indicates that the long observation window is full, if comparator 530 indicates that the number of NACK messages is less than or equal to the minimum threshold for packet errors in the long observation window, controller 570 decreases the power level of the transmission and resets packet counter 580 and the string of delays.

In one embodiment, if comparator 530 indicates that the number of NACK messages is greater than or equal to the maximum threshold for packet errors in the long observation window, controller 570 increases the power level of the transmission and resets packet counter 580 and the string of delays.

In alternate embodiments, the present invention can be implemented in any number of ways. For instance, in one embodiment, in addition to having registers for the three threshold values, registers are also used to program the size of the long and short observation windows. In which case, a maximum window size would depend on the number of delay elements D in the packet error counter, and the adders 510 and 520 would be configurably coupled to a number of delay elements based on the respective window sizes stored in the registers.

Figure 6:
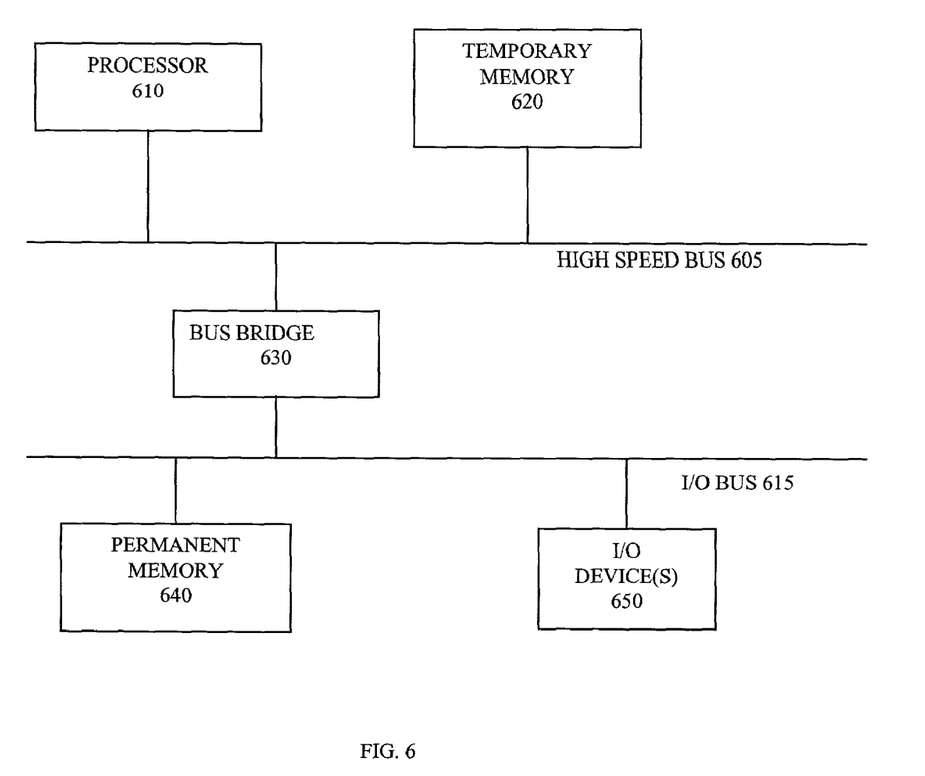
FIG. 6 illustrates one embodiment of a hardware system to implement the present invention in software.

FIG. 6 illustrates one embodiment of a hardware system intended to represent a broad category of computer systems such as personal computers, workstations, and/or embedded systems. In the illustrated embodiment, the hardware system includes processor 610 coupled to high speed bus 605, which is coupled to input/output (I/O) bus 615 through bus bridge 630. Temporary memory 620 is coupled to bus 605. Permanent memory 640 is coupled to bus 615. I/O device(s) 650 is also coupled to bus 615. I/O device(s) 650 may include a display device, a keyboard, one or more external network interfaces, etc.

Certain embodiments may include additional components, may not require all of the above components, or may combine one or more components. For instance, temporary memory 620 may be on-chip with processor 610. Alternately, permanent memory 640 may be eliminated and temporary memory 620 may be replaced with an electrically erasable programmable read only memory (EEPROM), wherein software routines are executed in place from the EEPROM. Some implementations may employ a single bus, to which all of the components are coupled, or one or more additional buses and bus bridges to which various additional components can be coupled. Those skilled in the art will be familiar with a variety of alternate internal networks including, for instance, an internal network based on a high speed system bus with a memory controller hub and an I/O controller hub. Additional components may include additional processors, a CD ROM drive, additional memories, and other peripheral components known in the art.

In one embodiment, the present invention, as described above, is implemented using one or more computers such as the hardware system of FIG. 6. Where more than one computer is used, the systems can be coupled to communicate over an external network, such as a local area network (LAN), an internet protocol (IP) network, etc.

In one embodiment, the present invention is implemented as software routines executed by one or more execution units within the computer(s). For a given computer, the software routines can be stored on a storage device, such as permanent memory 640.

Figure 7:
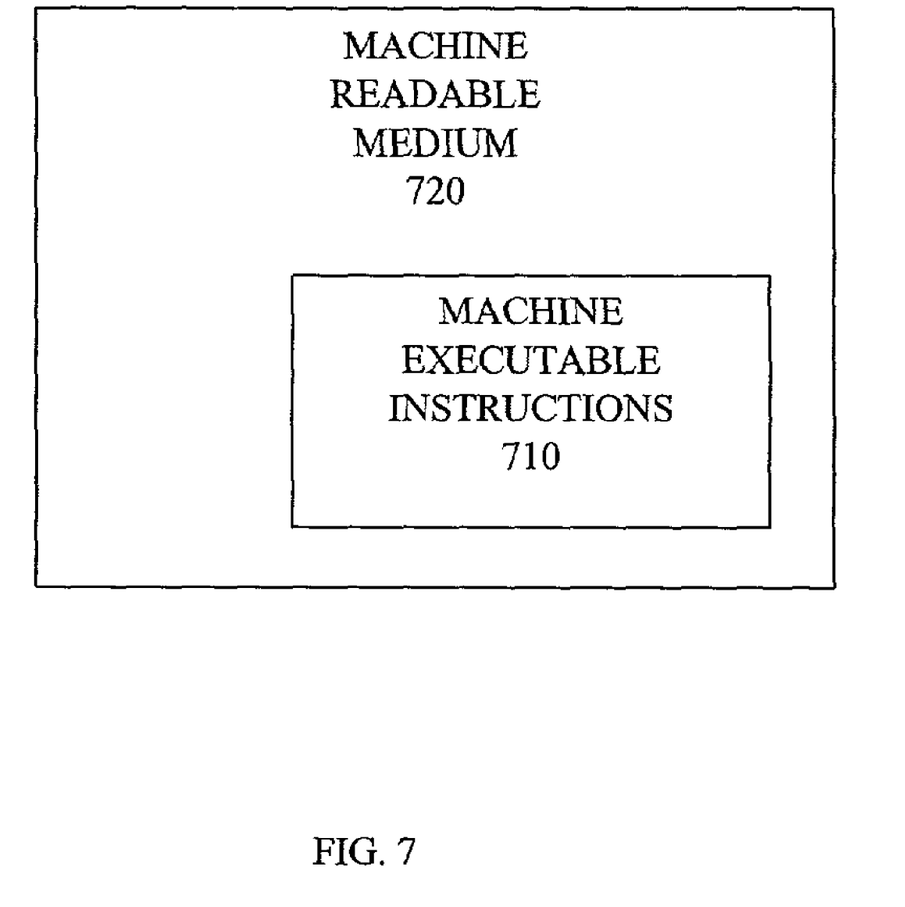
FIG. 7 illustrates one embodiment of a machine readable storage medium.

Alternately, as shown in FIG. 7, the software routines can be machine executable instructions 710 stored using any machine readable storage medium 720, such as a diskette, CD-ROM, magnetic tape, digital video or versatile disk (DVD), laser disk, ROM, Flash memory, etc. The series of instructions need not be stored locally, and could be received from a remote storage device, such as a server on a network, a CD ROM device, a floppy disk, etc., through, for instance, I/O device(s) 650 of FIG. 6.

From whatever source, the instructions may be copied from the storage device into temporary memory 620 and then accessed and executed by processor 610. In one implementation, these software routines are written in the C programming language. It is to be appreciated, however, that these routines may be implemented in any of a wide variety of programming languages.

In alternate embodiments, the present invention is implemented in discrete hardware or firmware. For example, one or more application specific integrated circuits (ASICs) could be programmed with one or more of the above described functions of the present invention. In another example, one or more functions of the present invention could be implemented in one or more ASICs on additional circuit boards and the circuit boards could be inserted into the computer(s) described above. In another example, field programmable gate arrays (FPGAs) or static programmable gate arrays (SPGA) could be used to implement one or more functions of the present invention. In yet another example, a combination of hardware and software could be used to implement one or more functions of the present invention.

Thus, power control in wireless communications based on estimated packet error rate is described. Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What is claimed is:

1. An apparatus comprising:
a counter to count packet errors in a wireless transmission, said counter to count a number of packet errors in a short observation window and to count a number of packet errors in a long observation window and wherein the counter comprises:
a plurality of registers coupled in a serial chain, said plurality of registers to receive a stream of packet status indications at a head of the serial chain, said plurality of registers to clock the stream of packet status indications through the plurality of registers;
a first adder to add the number of packet errors in the short observation window from among packet status indications at a first set of the plurality of registers comprising the short observation window and to provide a first result to the comparator; a second adder to add the number of packet errors in the long observation window from among packet status indications at a second set of the plurality of registers comprising the long observation window and to provide a second result to the comparator;
a comparator to compare the number of packet errors in the short observation window to a first threshold and to compare the number of packet errors in the long observation window to a second threshold; and
a controller, using power control that is capable of being open loop or capable of being closed loop, wherein said open loop power control enables a transmitter to unilaterally modify the power based on packet errors to increase a power level of the wireless transmission if the number of packets in the short observation window exceeds the first threshold and to decrease the power level of the wireless transmission if the number of packet errors in the long observation window falls below the second threshold.

2. The apparatus of claim 1 wherein the comparator is further to compare the number of packet errors in the long observation window to a third threshold, and wherein the controller is further to increase the power level of the wireless transmission if the number of packet errors in the long observation window exceeds a third threshold.

3. The apparatus of claim 1 wherein said wireless transmission comprising a plurality of packets of data sent to a remote destination, said remote destination to perform a cyclic redundancy check (CRC) on each of the plurality of packets, each said CRC failure to indicate a packet error;
said counter to receive a negative acknowledgement (NACK) message from the remote destination for each CRC failure, count a number of NACK messages corresponding to the number of packet errors in the short observation window, and count a number of NACK messages corresponding to the number of packet errors in the long observation window.

4. The apparatus of claim 1 wherein said wireless transmission comprises a plurality of packets of data received from a remote source, the apparatus further comprising:

an input device to receive the plurality of packets of data and perform a cyclic redundancy check (CRC) on each of the plurality of packets, each said CRC failure to indicate a packet error;

said counter to count a number of CRC failures in the short observation window and a number of CRC failures in the long observation window; and said controller to send an instruction to the remote source to increase the power level if the number of CRC failures in the short observation window exceeds the first threshold and to send an instruction to the remote source to decrease the power level if the number of CRC failures in the long observation window is below the second threshold.

5. The apparatus of claim 4 wherein the controller is further to send the instruction to the remote source to increase the power level if the number of CRC failures in the long observation window exceeds a third threshold.

6. The apparatus of claim 4 wherein the instruction to increase the power level and the instruction to decrease the power level comprise Link Manager Protocol (LMP) instructions.

7. The apparatus of claim 1 further comprising:
a plurality of registers to programmably store the first threshold and the second threshold, and to provide the first threshold and the second threshold to the comparator.

8. The apparatus of claim 1 further comprising:
a packet counter to count a number of packets in the wireless transmission and provide the number of packets to the controller, said controller to decrease the power level of the wireless transmission based on the long observation window only after the number of packets fills the long observation window.

9. An apparatus comprising:
a counter to count packet errors in a wireless transmission, said counter to count a number of packet errors in a short observation window and to count a number of packet errors in a long observation window;

a comparator to compare the number of packet errors in the short observation window to a first threshold and to compare the number of packet errors in the long observation window to a second threshold;

a controller to increase a power level of the wireless transmission if the number of packets in the short observation window exceeds the first threshold and to decrease the power level of the wireless transmission if the number of packet errors in the long observation window falls below the second threshold; and wherein the counter comprises:
a plurality of registers coupled in a serial chain, said plurality of registers to receive a stream of packet status indications at a head of the serial chain, said plurality of registers to clock the stream of packet status indications through the plurality of registers;

a first adder to add the number of packet errors in the short observation window from among packet status indications at a first set of the plurality of registers comprising the short observation window and to provide a first result to the comparator; a second adder to add the number of packet errors in the long observation window from among packet status indications at a second set of the plurality of registers comprising the long observation window and to provide a second result to the comparator.

* * * * *